United States Patent
Langarica

(12) 
(10) Patent No.: US 7,311,485 B1
(45) Date of Patent: Dec. 25, 2007

(54) SECURE TIE-DOWN ANCHOR WITH TENSION-HOLDING CAPABILITY

(76) Inventor: Joaquin M. Langarica, 1472 Parkington La., Tracy, CA (US) 95377-8172

( * ) Notice: Subject to any disclaimer, the term of this patent is extended or adjusted under 35 U.S.C. 154(b) by 136 days.

(21) Appl. No.: 11/154,132

(22) Filed: Jun. 15, 2005

(51) Int. Cl.
 *B60P 7/08* (2006.01)
(52) U.S. Cl. .................. 410/106; 410/102; 410/116
(58) Field of Classification Search ............ 410/101, 410/102, 106, 108, 110, 114–116; 248/499; 24/129 R, 130, 131 R, 115 K, 265 CD; 114/218
See application file for complete search history.

(56) References Cited

U.S. PATENT DOCUMENTS

| | | | |
|---|---|---|---|
| 2,853,959 A | 9/1958 | Goodwin | |
| 3,332,119 A | 7/1967 | Sherwood | |
| 3,595,125 A | 7/1971 | Jacobs | |
| 3,950,010 A | 4/1976 | Robertson | |
| 4,191,108 A | 3/1980 | Jones | |
| 4,248,558 A * | 2/1981 | Lechner | 410/104 |
| 4,253,785 A | 3/1981 | Barniak et al. | |
| 4,398,744 A | 8/1983 | Schoppel et al. | |
| 4,650,382 A | 3/1987 | Johnson | |
| 4,850,770 A | 7/1989 | Millar, Jr. | |
| 5,364,211 A | 11/1994 | Lund | |
| 5,533,848 A | 7/1996 | Davis | |
| 6,129,490 A | 10/2000 | Erskine et al. | |
| 6,821,067 B1 | 11/2004 | Von Loehr | |

* cited by examiner

*Primary Examiner*—Stephen Gordon
(74) *Attorney, Agent, or Firm*—David Pressman

(57) ABSTRACT

An anchor (100) for securing a rope (215) while holding tension comprises conjoined hook (105), foot (120, 125), and knee (115) sections. Both feet of the anchor are attached to a surface (200) where a first foot (120) forms one or more wedges (225, 230) with the surface. A rope from an object to be secured (220) passes beneath the knee, around the first foot and is secured by a knot (400) to the shank (110) of the hook. The first wedge (225) secures the rope and keeps it from slipping while the knot is tied. In an alternative embodiment, only one foot (120) is attached to the surface. This permits slidable entrance of the rope from the side of the anchor. The result is a firm anchorage which to which a rope can be fastened without the need for strength or dexterity on the part of the user.

9 Claims, 3 Drawing Sheets

SECURE TIE-DOWN ANCHOR WITH TENSION-HOLDING CAPABILITY

BACKGROUND

1. Field of Invention

This invention relates to rope anchors, and in particular to rope anchors with a tension-holding capability yet secure and simple construction.

2. Prior Art—Rope Anchors

Prior-art rope anchors, such as those used on the sides of trucks to anchor cargo tie ropes, have generally taken the shape of posts, hooks, or eyes which are affixed to a surface. The tie rope can be attached to the anchor in various ways, depending upon the anchor. For simple hook or post anchors, a loop, stabilized by one or more knots, is fashioned in a rope and hooked around the post or hook, which holds the loop in place. Alternatively for eye-type anchors, the rope is passed through the eye. The portion of the rope protruding from the eye is then secured with a knot around the portion of the rope entering the eye. Both methods result in a secure anchor. However, ropes secured to these anchors frequently slip and loosen slightly as knots are being tied, despite the user's strength and dexterity. The result is a less-than-taut tie-down.

3. Prior-Art—Lading Band Anchor

In U.S. Pat. No. 2,853,959 (1958) Goodwin teaches an anchor for use on railway freight cars. This anchor is of the eye type and is designed to receive lading bands, not ropes. Lading bands are generally secured by means other than knots, including well-known banding buckles and banding clips.

4. Prior-Art—Tie-Down Device and Rig for Securing Boat

Sherwood, in U.S. Pat. No. 3,332,119 (1967), teaches a resilient tie-down device comprising two back-to-back hooks. The hooks are formed from a single piece of wire. A first hook removably secures the device to the bumper of a vehicle. The second hook is split into two halves. Its two halves form a split hook member as they merge to define "a tightly closed throat from an open mouth entry which converges gradually to the closed throat." The convergent throat serves to hold the rope in place while it is being secured. Although this device is useful for securing anchor ropes, its construction is complex. In addition, it is intended for only temporary, springable attachment to a vehicle's bumper.

5. Prior-Art—Stake Pocket Tie-Downs

U.S. Pat. Nos. 3,595,125 (1971), 3,950,010 (1976), and 4,191,108 (1980) to Jacobs, Robertson, and Jones, respectively, teach tie-down devices which are inserted into stake openings on truck sides. These devices are either single-hook or eye types. While useful, they suffer from the same deficiencies as mentioned above in connection with single-hook or eye-type rope anchors.

6. Prior-Art—Side Rail Tie-Downs

U.S. Pat. Nos. 4,248,558 (1981) to Lechner, 4,253,785 (1981) to Bronstein, 4,650,382 (1987) to Johnson, 4,850,770 (1989) to Millar, Jr., 5,364,211 (1994) to Lund, 5,533,848 (1996) to Davis, 6,129,490 (2000) to Erskine et al., and 6,821,067 (2004) to Von Loehr all teach tie-downs for use on the sides of pickup and other truck beds. These various configurations employ hook-, pos-, and eye-type tie-downs for securing ropes. Again, while these tie-downs are useful, they suffer from the same deficiencies mentioned above in connection with single-hook, post, or eye-type rope anchors.

7. Prior-Art—Load Rod for Vehicles

In U.S. Pat. No. 4,398,744 (1983) Schöppel et al. teach a load rod for vehicles which comprises a two joined, bent cylindrical components forming a loop portion, and force-distributing legs that diverge from the loop portion and extend at a distance from each other. The legs are attached to a vehicle body by welding, for example. This load rod is used in pulling or pushing the vehicle to which it is attached. Again, the loop portion of the load rod forms an eye-type anchor. While it is useful in performing the task for which it is intended, it would suffer from the previously-mentioned eye-type anchor deficiencies if used as a tie-down point.

8. Objects and Advantages

Accordingly, one object and advantage of the present invention is to provide an improved method and apparatus for anchoring tie-down ropes. Other objects and advantages are to provide an inexpensive and simple anchoring apparatus which is compact, easy to use, and simple in construction. Also it permits tensioning of a rope while it is being secured, resulting in a taut anchor.

Additional objects and advantages will become apparent from a consideration of the drawings and ensuing description.

SUMMARY

In accordance with the present invention, a method and apparatus are described that provide a simple and sturdy rope anchor with a tension-holding capability. In the preferred embodiment a hook and an eye are joined and function together as a unit. They are mounted to an anchoring surface. A rope is passed through the eye, wedged at the inner edge of the eye, and tied around the shaft of a hook. In an alternative embodiment, one side of the eye is lifted from the anchoring surface. This allows a portion of the rope, away from the end, to be slid into the eye without having to feed the end of the rope through the eye. The rope is pulled taut, wedged into the side of the eye adjacent the hook, and tied around the shank of the hook. The result is a secure, taut anchoring of the rope.

DRAWINGS

Figures

Figure 1A:
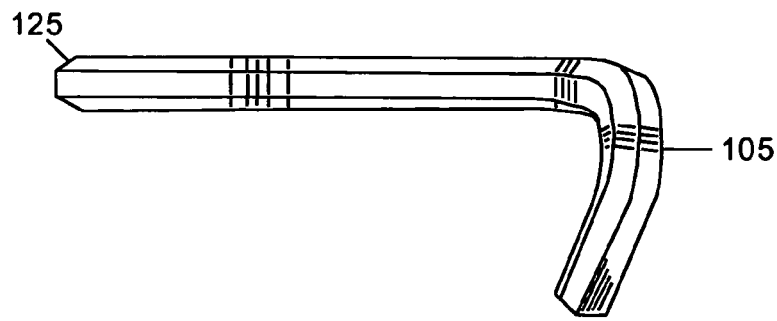
FIGS. 1A, 1B, 1C show top, side, and end views of a preferred embodiment of a tie-rope anchor according to the invention.

| DRAWINGS-Reference Numerals | | | | | |
|---|---|---|---|---|---|
| 105 | Hook | 110 | Shank | 115 | Knee |
| 120 | Foot | 125 | Foot | 200 | Surface |
| 205 | Attachment | 210 | Attachment | 215 | Rope |
| 220 | Object | 225 | Wedge | 230 | Wedge |
| 400 | Knot | 405 | Foot extension | 410 | Bolt |
| 415 | Weld | 500 | Bolt | 600 | Location |
| 605 | Location | 610 | Location | 615 | Tie-down |
| 620 | Tie-down | | | | |

DETAILED DESCRIPTION

Preferred Embodiment

FIGS. 1-4

Figure 1B:
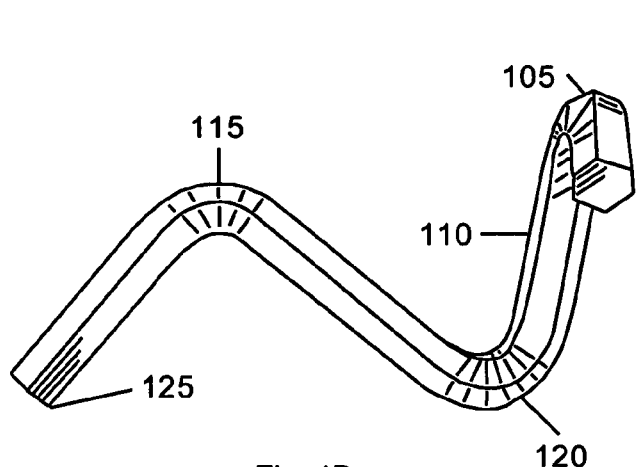
Figure 1C:
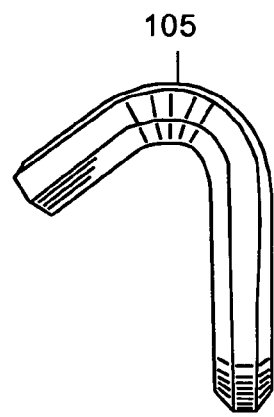

FIGS. 1A-1C show top, front, and end views of a tie-down anchor according to the invention. A rod (preferably with a hexagonal cross-section about 8 mm in diameter and 25 cm long) is bent into a shape as follows:

Starting at the left or first end 125 in FIGS. 1A and 1B, a first 90 degree bend or bight is made about 30 percent of the rod length from end 125 to form a first bend or knee 115. The straight or first section between end 125 and knee 115 lies in a first plane.

Then a second bend 120 is made at about 30 percent of the entire rod's length from knee 115 to form a next or second section between knee 115 to second bend 120. This second section also lies in the first plane. Second bend 120 also forms and will also be referred to as a first foot 120.

Then a third bend 105 is made at about 20 percent of the length of the entire rod from foot 120 to form a third section or shank 110 between foot or bend 120 and bend 105. Section 110 lies in the same plane as the first and second sections.

Finally, the remaining or fourth section of the rod is bent downward in a second plane at an angle of about 80 degrees to the first plane and the third section, completing the anchor.

The size of the anchor is determined by a number of factors, including the load force to be restrained, and the diameter of a rope 215 (FIG. 2) to be anchored. For a rope diameter of 7 mm, the anchor in its bent configuration is preferably 12 cm long, and 7 cm high overall and the rod is 25 cm long before bending.

Figure 5:
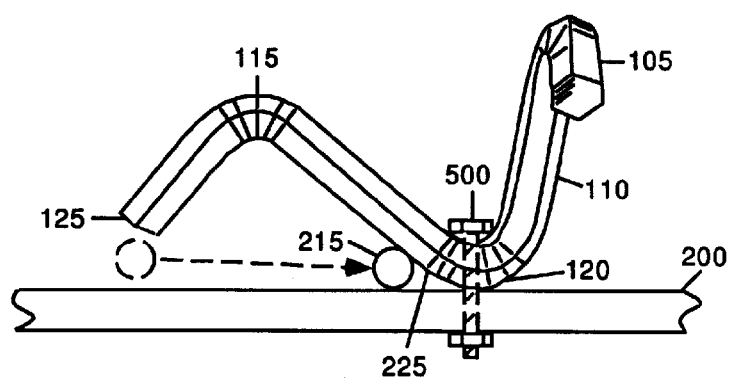
FIG. 5 is a side view of an alternative embodiment showing entrance of a rope from the side and an alternative mounting.

In use, the anchor is attached to a rigid surface 200 (FIG. 2) by one or more welds 205 and 210, or by a bolt, screw, or other mechanical fastener 500 (FIG. 5). Alternatively, the anchor can be molded (not shown) as a part of rigid surface 200.

The first plane containing knee 115, and feet 120 and 125, and the first, second, and third sections is generally perpendicular to the horizontal plane of surface 200 so that section 110 and knee 115 project upward from surface 200.

Figure 2:
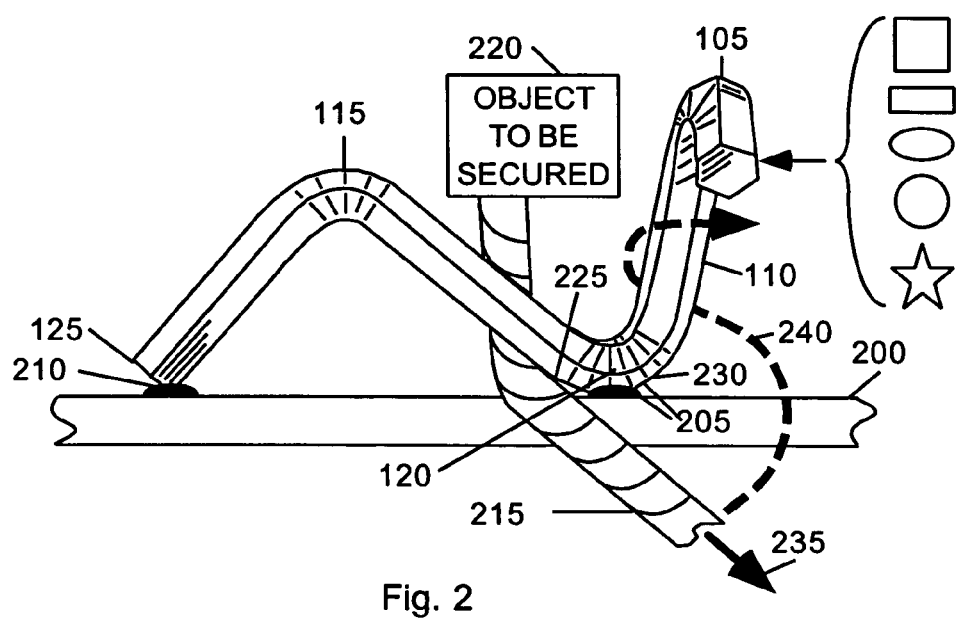
FIG. 2 is a side view of the preferred embodiment with a rope inserted.

The anchor is generally made from non-rusting or coated steel, but may also be made of another metal, or even reinforced plastic. The cross-section of the anchor is shown as hexagonal; however many other cross-sectional shapes are possible, including but not limited to square, rectangular, oval, circular, and star-shaped, as indicated in FIG. 2.

While the second plane containing hook or bend 105 is generally inclined at an angle of 80 degrees with respect to surface 200 (FIG. 2); this angle can vary by ten or more degrees, depending on the diameter of rope 215 being anchored, as explained below.

VARIATIONS

Figure 3:
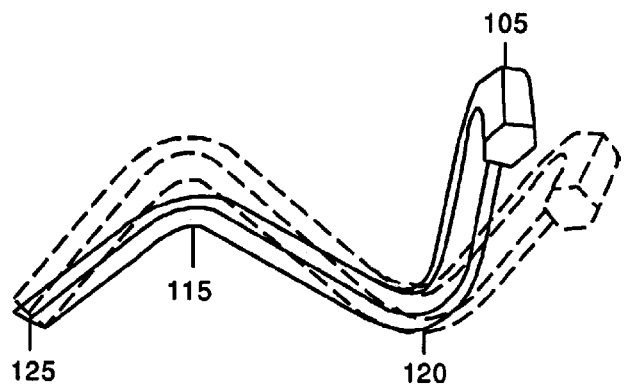
FIG. 3 is a side view of the preferred embodiment showing different wedge and hook angles.

Similarly the lengths of the first and second sections and the angles of the first and second bends can be adjusted to make knee 115 higher or lower than surface 200, as required. These variations are shown in broken lines in FIG. 3.

Figure 4:
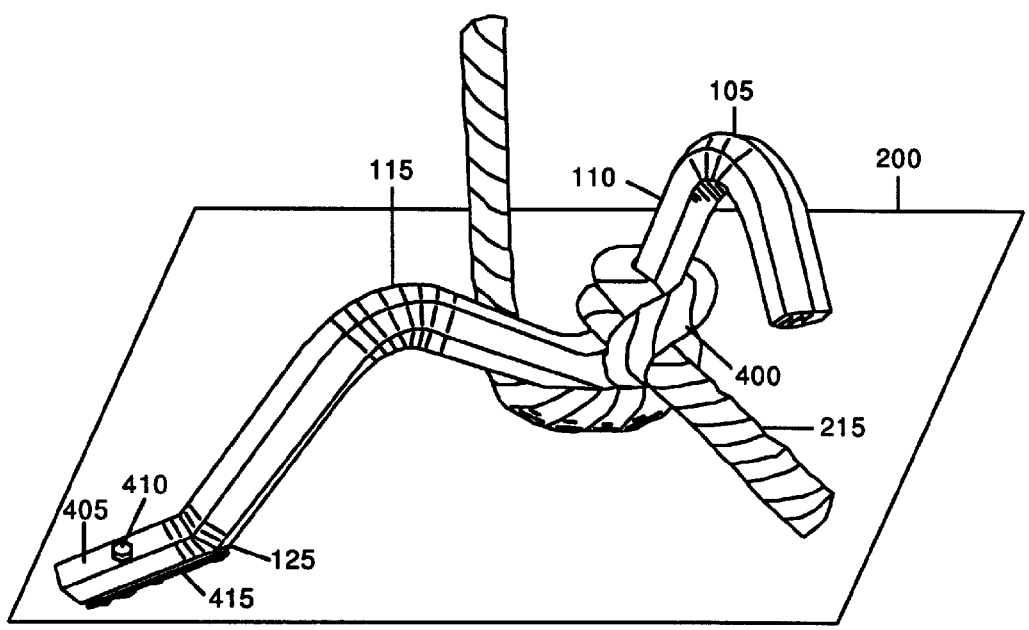
FIG. 4 is a perspective view of the embodiment of FIG. 1 in use.

An optional extension 405 of second foot 125 is shown in FIG. 4. Extension 405 provides extra strength when heavier loads are secured by rope 215. Extension 405 is secured to surface 200 by an optional weld 415, bolt 410, or both.

OPERATION

Preferred Embodiment

FIGS. 2 and 4

To use the anchor, assume that surface 200 (FIG. 2) is the edge of a side of a pickup truck and rope 215 is attached to or passed over an object 220 (e.g., a stack of lumber) to be secured in the bed of the truck. Rope 215 is then passed beneath knee 115 (i.e., through the loop formed by knee 115) and is pulled by the user (not shown) into a first wedge 225 formed to the left of attachment point 205 to prevent slippage. Next tension is maintained in rope 215, as indicated by arrow 235, and rope 215 is then moved as indicated by arrow 240 and is looped or tied around shank 110 of hook 105.

Rope 215 is next tied around shank 110 (FIG. 4) in a double-hitch or other convenient knot 400. Section 110 of the anchor and surface 200 form a second wedge 230 (FIG. 5) to the right of attachment point 205. Wedges 225 and 230 hold the tension and thus help prevent slippage of rope 215 during and after the tying of knot 400.

I.e., forcing rope 215 into wedge 225 permits the user (not shown) to maintain tension with the left (or right) hand while tying a simple knot around shank 110 with the other hand. After the knot is tied around shank 110, the user pulls firmly on the loose end of the rope with the right (or left) hand, forcing a portion of the knot to move into wedge 230 on the right side of the anchor. Wedges 225 and 230 provide high-friction, compression points which deform the rope and thus help prevent any slippage of the rope when tying the knot. Thus rope 115 is firmly secured without the need for strength or dexterity on the part of the user.

As shown at 610 in FIG. 6, discussed in more detail below, the fourth section of the anchor and bend 105 form a hook which can be used as an additional tie-down for a rope 620, or an elastic cord or the like.

DESCRIPTION AND OPERATION

Alternative Embodiment

FIG. 5

In the embodiment of FIG. 5, foot 125 is raised above and is not attached to surface 200. Foot 120 is attached to surface 200 by one of the means described above. This arrangement permits introduction of rope 215 into wedge 225 from the side, instead of threading it beneath knee 115, as in the preferred embodiment. This is useful when rope 215 is very long. It is still possible to tie two half-hitch knots around shank 110 of hook 105.

OPERATION

Preferred and Alternative Embodiments

Deployment

FIG. 6

Multiple anchors will generally be deployed on a vehicle. E.g., if surface 200 (FIG. 6) is a side rail above the bed of a pickup or other truck, the anchors are attached to both side rails. Although three anchors are shown, six or more can be provided.

Figure 6:
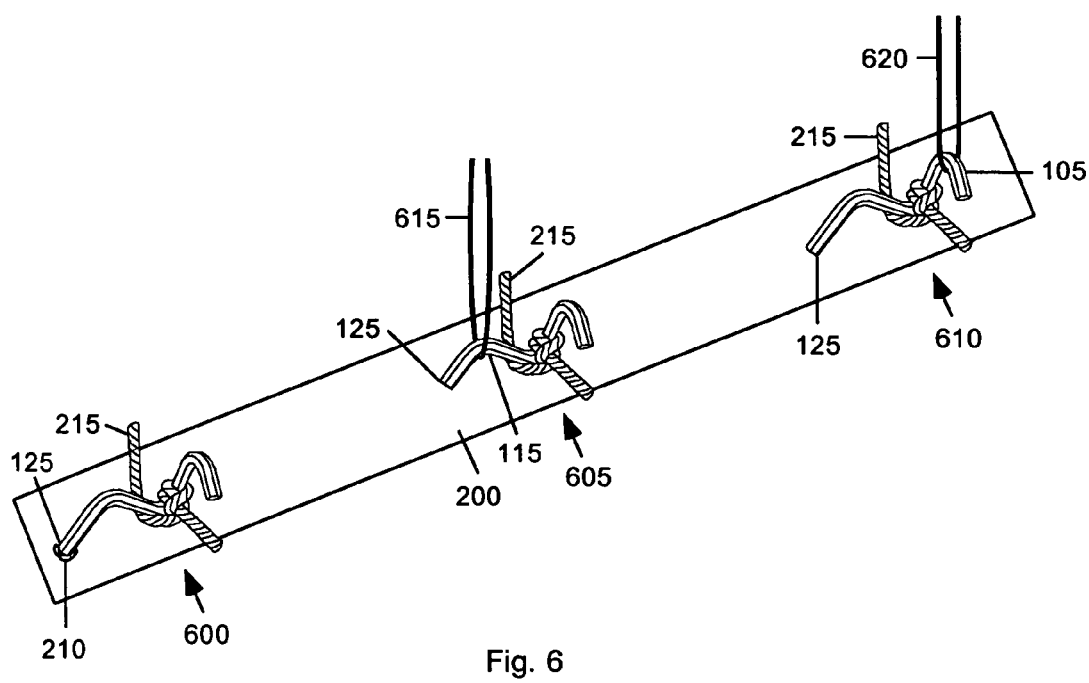
FIG. 6 is a perspective view of the preferred and alternative embodiments in use.

The preferred embodiment of the anchor (FIGS. 1 and 2) is shown at 600 in FIG. 6. The alternative embodiment (FIG. 5) of the anchor is shown at 605 in FIG. 6. Foot 120 is attached to surface 200, as above. Foot 125 is raised above surface 200 to permit insertion of rope 215 from the side. A second tie-down rope 615 has also been inserted beneath foot 125 and secures a load (not shown) to anchor 100 at knee 115.

The preferred embodiment of anchor 100 is shown again at 610 (FIG. 6). Foot 120 is attached to surface 200, as above. In this case, foot 125 is in contact with, but not attached to surface 200 since a single attachment point is adequate in some cases. A second tie-down rope 620 is attached to hook 105.

CONCLUSION, RAMIFICATIONS, AND SCOPE

The present rope anchoring system provides a novel method and apparatus for anchoring a rope firmly to a surface. It provides multiple anchor points and types of anchors. Loads can be independently attached to the knee, hook, and foot of the anchor. These anchor points can be used singly or in combination.

One or more wedges formed between the base of the anchor and the surface on which it is mounted help to prevent slippage of a tie-down rope while a knot is being tied for securing the rope to the anchor.

Sideways insertion of the rope is facilitated by lifting one foot of the anchor. This is useful when the rope is long and it would be inconvenient to thread it beneath the knee before securing it to the anchor.

While the above description contains many specificities, these should not be considered limiting but merely exemplary. Many variations and ramifications are possible. Instead of gentle curves, the knee, anchor points, and hook can be formed from sharp, acute angles. Instead of metal or plastic, the anchor can be made of wood, glass, or other materials. Instead of being made of solid material, the anchor can be made of a tubular material. Instead of being purely functional, the anchor can serve decorative purposes. Rather than being rigidly attached to a surface, the anchor can be hingeably attached for added flexibility in securing various loads or even collapsible for stowage. Instead of the side of a pickup truck the anchor can be attached to a variety of surfaces, including but not limited to flagpoles, docks, boat railings, and the like.

The fourth section which completes the hook can be eliminated. The knot which secures the rope is tied around the remaining shank.

While the present system employs elements which are well known to those skilled in the art of anchor design, it combines these elements in a novel way which produces a new result not heretofore discovered. Accordingly the scope of this invention should be determined, not by the embodiments illustrated, but by the appended claims and their legal equivalents.

The invention claimed is:

1. An anchor for enabling a rope to be securely anchored to a surface, comprising:
    a hook having three substantially straight portions identified as first, second, and third portions, each of said portions having first and second ends,
    said first end of said first portion being attached to said surface at a first location on said surface,
    said second end of said first portion being connected to said first end of said second portion at a first bend,
    said second end of said second portion being connected to said first end of said third portion at a second bend,
    said second bend being attached to said surface at a second location on said surface spaced from said first location,
    said first bend being spaced from and separate from said surface,
    said surface, said first section, and said second section forming an enclosed loop to which said rope can be attached,
    said third portion extending away from said surface so that said second end of said third portion is spaced from said surface so that after said rope in inserted into said loop, said rope can also be secured around said third portion.

2. The anchor of claim 1 wherein said second bend is attached to said surface by means selected from the group consisting of welds and bolts.

3. The anchor of claim 1 wherein a cross-section of said anchor is selected from the group consisting of hexagonal, square, rectangular, oval, circular, and star-shaped.

4. The anchor of claim 1 wherein said first, second, and third portions are substantially coplanar.

5. The anchor of claim 1 wherein said enclosed loop is triangular.

6. The anchor of claim 1, further including a fourth portion having first and second ends, said first end of said fourth portion being connected to said third portion by a third bend, said third bend being spaced from said surface, whereby an additional anchoring section is provided.

7. The anchor of claim 6 wherein said first, second, and third portions are substantially coplanar and said fourth portion is oriented at an angle to said first, second, and third portions.

8. The anchor of claim 7 wherein said angle is between 10 and 80 degrees.

9. An anchor for attaching a rope to an object, comprising:
    an object having a base surface,
    a rodlike elongated member,
    a first end of said rodlike elongated member being attached to a first point on said base surface,
    a first section of said member extending up and away from said first point on said base surface at an angle to said base surface,
    said rodlike elongated member having a first bend at an end of said first section,
    said rodlike elongated member having a second section, said first bend connecting said first section to said second section of said rodlike elongated member,
    said second section of said rodlike elongated member extending from said first bend to a second bend at an end of said second section,
    said second bend being attached to a second point on said base surface, said second point on said base surface being spaced from said first point on said base surface,
    said surface, said first section, and said second section forming an enclosed loop to which said rope can be attached,
    said rodlike elongated member having a third section, said second bend connecting said second section to said third section of said member,
    said third section extending up and away from said second point on said base surface at an angle to said base surface so that after said rope is inserted into said loop, said rope can be secured around said third section.

* * * * *